(12) United States Patent
Hjelmstedt et al.

(10) Patent No.: US 9,398,338 B2
(45) Date of Patent: *Jul. 19, 2016

(54) UTILIZATION OF REMOTE CONTROL TO DISPLAY MEDIA

(71) Applicant: Magine Holding AB, Stockholm (SE)

(72) Inventors: Mattias Hjelmstedt, Sollentuna (SE); Mats Johan Liseborn, Gustavsberg (SE)

(73) Assignee: MAGINE HOLDING AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,419

(22) Filed: Jul. 3, 2014

(65) Prior Publication Data

US 2014/0317650 A1 Oct. 23, 2014

Related U.S. Application Data

(63) Continuation of application No. 13/798,193, filed on Mar. 13, 2013.

(30) Foreign Application Priority Data

Jul. 27, 2012 (SE) ...................................... 1200467

(51) Int. Cl.
*H04N 21/4627* (2011.01)
*H04N 21/61* (2011.01)
*H04W 4/00* (2009.01)
*H04N 21/482* (2011.01)
*H04N 21/643* (2011.01)

(52) U.S. Cl.
CPC ......... *H04N 21/4627* (2013.01); *H04N 21/482* (2013.01); *H04N 21/6175* (2013.01); *H04N 21/643* (2013.01); *H04W 4/001* (2013.01)

(58) Field of Classification Search
CPC . H04N 21/02; H04N 21/42204; H04N 21/04; H04N 21/06; H04N 21/482; H04N 21/4126
See application file for complete search history.

(56) References Cited

U.S. PATENT DOCUMENTS

| 6,389,473 | B1 | 5/2002 | Carmel et al. |
| 7,797,004 | B2 | 9/2010 | Patel |
| 8,010,977 | B2 | 8/2011 | Hogyoku |

(Continued)

FOREIGN PATENT DOCUMENTS

| EP | 2124440 A1 | 11/2009 |
| EP | 2662790 A2 | 11/2013 |

(Continued)

OTHER PUBLICATIONS

Lawton, G., "Wireless HD Video Heats Up," Computer, vol. 41, No. 12, pp. 18-20, Dec. 2008, doi: 10,1109/MC.2008.509; p. 18.

*Primary Examiner* — Mark D Featherstone
*Assistant Examiner* — Michael M Nguyen
(74) *Attorney, Agent, or Firm* — Renner, Otto, Boisselle & Sklar, LLP

(57) ABSTRACT

A system (10), a method and a utilization of a remote control adapted to display media content from the World Wide Web (12). This is accomplished by utilizing a smart-phone (18) as a remote control by an application program, and transmitting the media content through a backend system (110) utilizing WI-FI adapters to (20) transmit streaming media to for instance a HDMI TV (16).

20 Claims, 2 Drawing Sheets

(56) References Cited

U.S. PATENT DOCUMENTS

Figure 1:
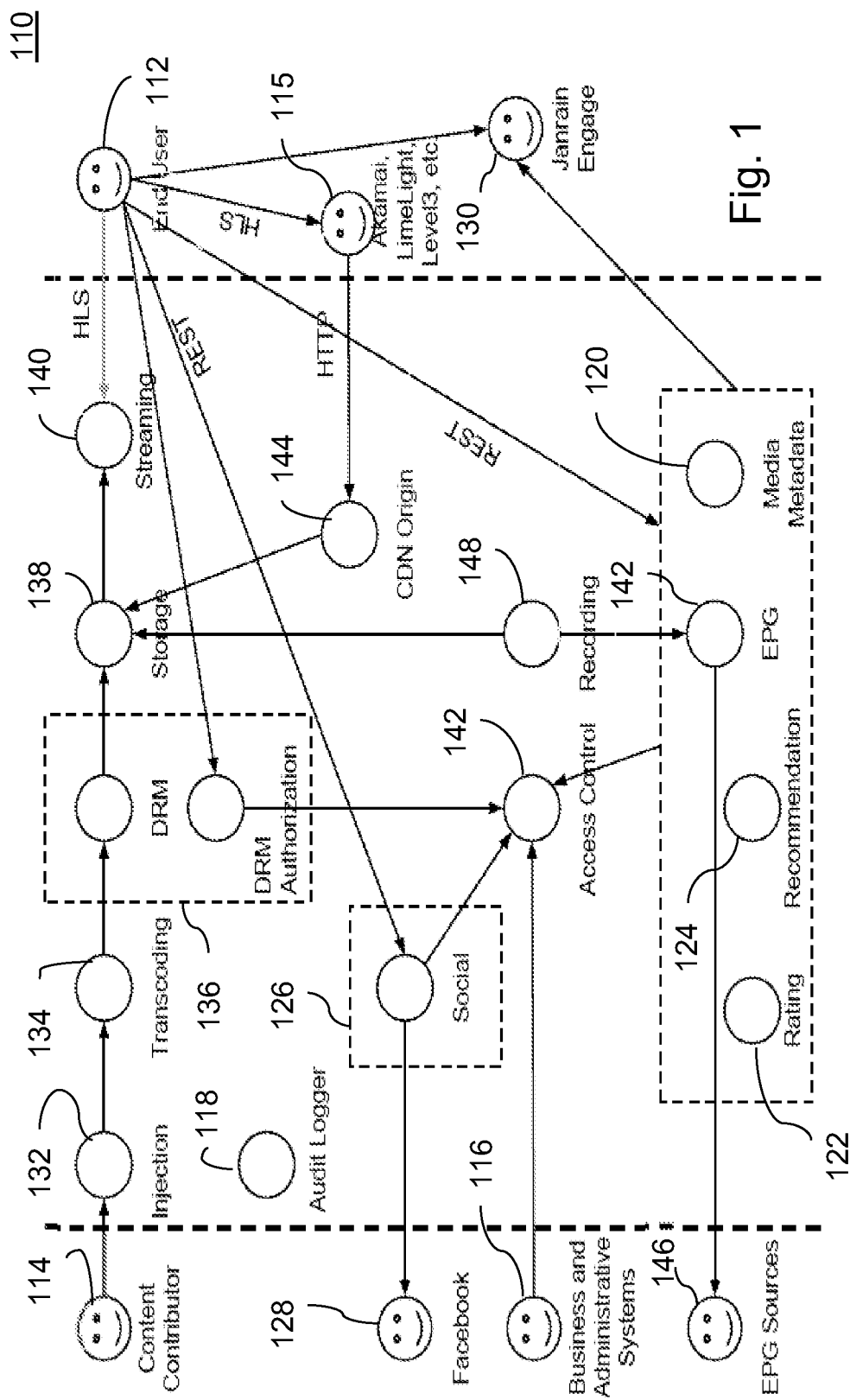

| | | | |
|---|---|---|---|
| 8,150,387 B2 | 4/2012 | Klein et al. | |
| 8,370,878 B2 | 2/2013 | Gharachorloo et al. | |
| 8,406,241 B2 | 3/2013 | Ansari | |
| 8,407,755 B2 | 3/2013 | Xiong et al. | |
| 8,458,741 B2 | 6/2013 | Xiong et al. | |
| 8,572,660 B2 | 10/2013 | Riley et al. | |
| 8,584,164 B2 | 11/2013 | Walter et al. | |
| 8,621,548 B2 | 12/2013 | Friedman | |
| 8,660,545 B1 | 2/2014 | Redford et al. | |
| 8,677,402 B2 | 3/2014 | Pedlow et al. | |
| 2003/0014436 A1 | 1/2003 | Spencer et al. | |
| 2003/0035007 A1* | 2/2003 | Wugofski | 345/764 |
| 2003/0115606 A1 | 6/2003 | Menez | |
| 2003/0149988 A1* | 8/2003 | Ellis et al. | 725/87 |
| 2007/0143856 A1* | 6/2007 | Aerrabotu et al. | 726/26 |
| 2008/0152316 A1 | 6/2008 | Sylvain | |
| 2008/0256205 A1 | 10/2008 | Mahoney | |
| 2009/0150553 A1 | 6/2009 | Collart et al. | |
| 2009/0172780 A1 | 7/2009 | Sukeda et al. | |
| 2010/0111504 A1 | 5/2010 | Yu et al. | |
| 2010/0115575 A1 | 5/2010 | Yu et al. | |
| 2010/0150521 A1 | 6/2010 | Chow et al. | |
| 2010/0306402 A1 | 12/2010 | Russell et al. | |
| 2010/0333143 A1* | 12/2010 | Civanlar et al. | 725/54 |
| 2011/0158610 A1 | 6/2011 | Paul et al. | |
| 2011/0304443 A1 | 12/2011 | Sheridan et al. | |
| 2012/0011529 A1 | 1/2012 | Howcraft et al. | |
| 2012/0017237 A1 | 1/2012 | Pan | |
| 2012/0079541 A1 | 3/2012 | Pan | |
| 2012/0090004 A1 | 4/2012 | Jeong | |
| 2012/0117596 A1 | 5/2012 | Mountain et al. | |
| 2012/0127363 A1 | 5/2012 | Kanojia et al. | |
| 2012/0127374 A1 | 5/2012 | Kanojia et al. | |
| 2012/0129479 A1 | 5/2012 | Kanojia et al. | |
| 2012/0130971 A1 | 5/2012 | Morris | |
| 2012/0131621 A1 | 5/2012 | Kanojia et al. | |
| 2012/0162515 A1* | 6/2012 | Lee et al. | 348/563 |
| 2012/0162536 A1 | 6/2012 | Sibilsky et al. | |
| 2012/0168510 A1* | 7/2012 | Gratton | G06Q 30/0282 235/462.1 |
| 2012/0198508 A1 | 8/2012 | Kuo | |
| 2012/0204093 A1 | 8/2012 | Habarakada et al. | |
| 2012/0210226 A1 | 8/2012 | McCoy et al. | |
| 2012/0210353 A1 | 8/2012 | Wong et al. | |
| 2012/0240142 A1 | 9/2012 | Rose | |
| 2012/0266198 A1 | 10/2012 | Kanojia et al. | |
| 2012/0266201 A1 | 10/2012 | Kanojia et al. | |
| 2012/0270509 A1* | 10/2012 | Lewis | H04W 4/206 455/88 |
| 2012/0297423 A1 | 11/2012 | Kanojia et al. | |
| 2012/0304238 A1 | 11/2012 | Rivera | |
| 2012/0309381 A1 | 12/2012 | Almeda et al. | |
| 2012/0324504 A1 | 12/2012 | Archer et al. | |
| 2013/0032634 A1 | 2/2013 | McKirdy | |
| 2013/0109295 A1 | 5/2013 | Lipowski et al. | |
| 2013/0145403 A1 | 6/2013 | Sofos et al. | |
| 2013/0191553 A1 | 7/2013 | Wyler | |
| 2013/0191858 A1 | 7/2013 | Kanojia et al. | |
| 2013/0191875 A1 | 7/2013 | Morris et al. | |
| 2013/0205352 A1 | 8/2013 | Lipowski et al. | |
| 2013/0207870 A1 | 8/2013 | Lipowski et al. | |
| 2013/0239146 A1 | 9/2013 | Cherry et al. | |
| 2013/0246530 A1 | 9/2013 | Lentzitzky | |
| 2013/0247108 A1 | 9/2013 | Lam | |
| 2013/0263171 A1 | 10/2013 | Calhoun et al. | |
| 2013/0282868 A1 | 10/2013 | Chung et al. | |
| 2013/0339991 A1 | 12/2013 | Ricci | |
| 2014/0006377 A1 | 1/2014 | Astore | |
| 2014/0006947 A1 | 1/2014 | Garmark et al. | |
| 2014/0033257 A1 | 1/2014 | Hjelmstedt | |
| 2014/0068466 A1 | 3/2014 | Garcia et al. | |
| 2014/0068673 A1 | 3/2014 | Sirpal et al. | |
| 2014/0068677 A1 | 3/2014 | Rimon et al. | |

FOREIGN PATENT DOCUMENTS

| | | |
|---|---|---|
| GB | 2471883 A | 1/2011 |
| WO | 0197147 A1 | 12/2001 |
| WO | 2011/047024 A1 | 4/2011 |
| WO | WO 2011047024 A1 * | 4/2011 |
| WO | 2011/139155 A1 | 11/2011 |
| WO | 2012131055 A1 | 10/2012 |
| WO | 2012168479 A2 | 12/2012 |
| WO | 2014036568 A1 | 3/2014 |

* cited by examiner

UTILIZATION OF REMOTE CONTROL TO DISPLAY MEDIA

RELATED APPLICATION DATA

This application is a continuation of U.S. application Ser. No. 13/798,193 filed on Mar. 13, 2013, which claims priority of Swedish Patent Application No. 1200467-7 filed on Jul. 27, 2012, which is hereby incorporated herein by reference in its entirety.

TECHNICAL FIELD

The present invention pertains to a system, a method, and a utilization of a remote control, all adapted to display media content from the World Wide Web on an apparatus screen.

BACKGROUND ART

Currently, media such as cable TV is transmitted to a television set by cable through for instance a set top box, i.e. an end-user/TV viewer is not able to connect to the Internet in order to catch media material, and directly send it to the TV set. To be able to view media content from the Internet, the end-user has to connect a computer to the TV set. Also, the end-user has to have a computer with an HDMI port/interface to be able to view HDMI content.

For the layman end-user it is a problem to connect a computer to a set top box and TV.

It is appreciated that a new set of TVs already are equipped with WI-FI adapters, i.e. so called smart-TV-sets. But there are huge amounts of quite new TV-sets, which lack a WI-FI adapter, and in accordance with the present invention such TV-sets can also be utilized to perform the present invention.

SUMMARY OF THE INVENTION

One aim among others of the present invention is to simplify for end-users to watch media content from the Internet on a television set with our without a WI-FI adapter.

Another important feature of the present invention comprises that the remote control in the form of a smart phone or smart pad is not directed to the apparatus it shall control, but to a backend system in accordance with the present invention.

Hence, the present invention sets forth a system adapted to display media content from the World Wide Web. By accomplishing this, the invention comprises:

a backend system providing media content through an electronic program guide (EPG);

an apparatus with a screen having a high-definition multimedia interface (HDMI) capability;

an interface to the apparatus screen high-definition multimedia interface, the interface being equipped with at least one of a WI-FI adapter, and a wired connection to the World Wide Web;

a remote control being equipped with, a screen, and at least one of a WI-FI adapter, a cellular network by radio communication, and a web browser, the at least one of a WI-FI adapter, a cellular network by radio communication, being in in connection with at least one of a WI-FI access point, a cellular network by radio communication, and controlling the apparatus indirectly through the backend system;

a software application program (App) adapted to connect to the backend system, showing electronic program information (EPG) about media content on the remote control screen, browsing said electronic program information and selecting a media content to be viewed by a user of the remote control through the backend system; and a backend system server software application program redirecting the selected streaming media content to at least one of the WI-FI access point, and a wired connection to the World Wide Web, and addressing the apparatus, which is at least in one of in WI-FI transmitting proximity to the apparatus, and in wired connection to the World Wide Web, receiving the streaming selected media content from the backend system, and displaying the media content on the apparatus screen through at least one of the apparatus WI-FI adapter, and the wired connection to the World Wide Web.

In one embodiment the present invention provides that the remote control is constituted by at least one of an IPhone®, IPad®, and an android device.

Another embodiment provides that the interface to the apparatus screen high-definition multimedia interface is embedded in the apparatus.

A further embodiment provides that the WI-FI access point is a broadband modem recognized by its IP-address.

Still one embodiment provides that the interface to the apparatus screen high-definition multimedia interface is a dongle inserted in a HDMI port of the apparatus.

A still further embodiment provides that the dongle is equipped with a USB port for powering of the dongle.

Yet one embodiment provides that the web browser is utilized together with a plug in supporting Digital Rights Management (DRM) access control.

Yet still another embodiment provides that the backend system stores the electronic program information (EPG) for a predetermined time, enabling a remote control user to watch specific media content on demand backwards in time.

A further embodiment provides that the apparatus is at least one of an IPhone®, IPad®, TV-set, Laptop, computer, and an android device.

Yet a further embodiment provides that a remote control inherent camera/scanner is utilized to photograph/scan a barcode from the screen of the apparatus, whereby the barcode comprises all of the apparatus particulars needed to receive media content from the backend system.

Further, one embodiment provides that the invention remote control Indirectly utilizes the apparatus for remote control, but the cloud backend system is remotely controlled to transmit media content/menus to the apparatus.

Still another embodiment provides that the redirecting of the media content to the apparatus WI-FI adapter is accomplished by utilizing the apparatus media access control address, MAC address, and it is also added a unique code.

Still one embodiment provides that an EPG menu or other menu presenting media content can be pushed through the remote control to the apparatus, thus an end user is able to choose media to watch from the apparatus screen, and to select the media to watch by the remote control.

Moreover, the present invention sets forth a method adapted to display media content from the World Wide Web. Thus the invention comprises the steps of:

providing through a backend system media content through an electronic program guide (EPG);

providing media on an apparatus screen having a high-definition multimedia interface (HDMI) capability;

interfacing to the apparatus screen high-definition multimedia interface through at least one of a WI-FI adapter, and a wired connection to the World Wide Web;

remotely controlling which media content to be shown on the apparatus screen through a device being equipped with, a screen, and at least one of the WI-FI adapter, a cellular network by radio communication, and the browser, being in in connection with at least one of a WI-FI access point, and a cellular network by radio communication, thus controlling the apparatus indirectly through the backend system;

adapting a software application program to connect to the backend system, showing electronic program information (EPG) about media content on the remote control screen browsing said electronic program information and selecting a media content to be viewed by a user of the remote control through the backend system; and re-directing through a backend system software application program, the selected streaming media content to at least one of a WI-FI access point, and a wired connection to the World Wide Web, and addressing the apparatus, which at least is in one of WI-FI transmitting proximity to the apparatus, and the wired connection to the World Wide Web, receiving the streaming selected media content from the backend system, and displaying the media content on the apparatus screen through at least one of the apparatus WI-FI adapter, and a wired connection to the World Wide Web.

Furthermore, the present invention sets forth a utilization of a remote control to transmit media content from the World Wide Web, providing that:

the remote control is of the type constituted by at least one of an IPhone®, IPad®, and an android device adapted through an application suitable for this matter to control an apparatus, which is at least one of an IPhone®, IPad®, a TV-set, Laptop, computer, and an android device through a backend system in the World Wide Web, which directs the media content to the apparatus.

It is appreciated that the attached dependent method claims adhere to the attached dependent system claims.

A BRIEF DESCRIPTION OF THE DRAWING

Figure 2:
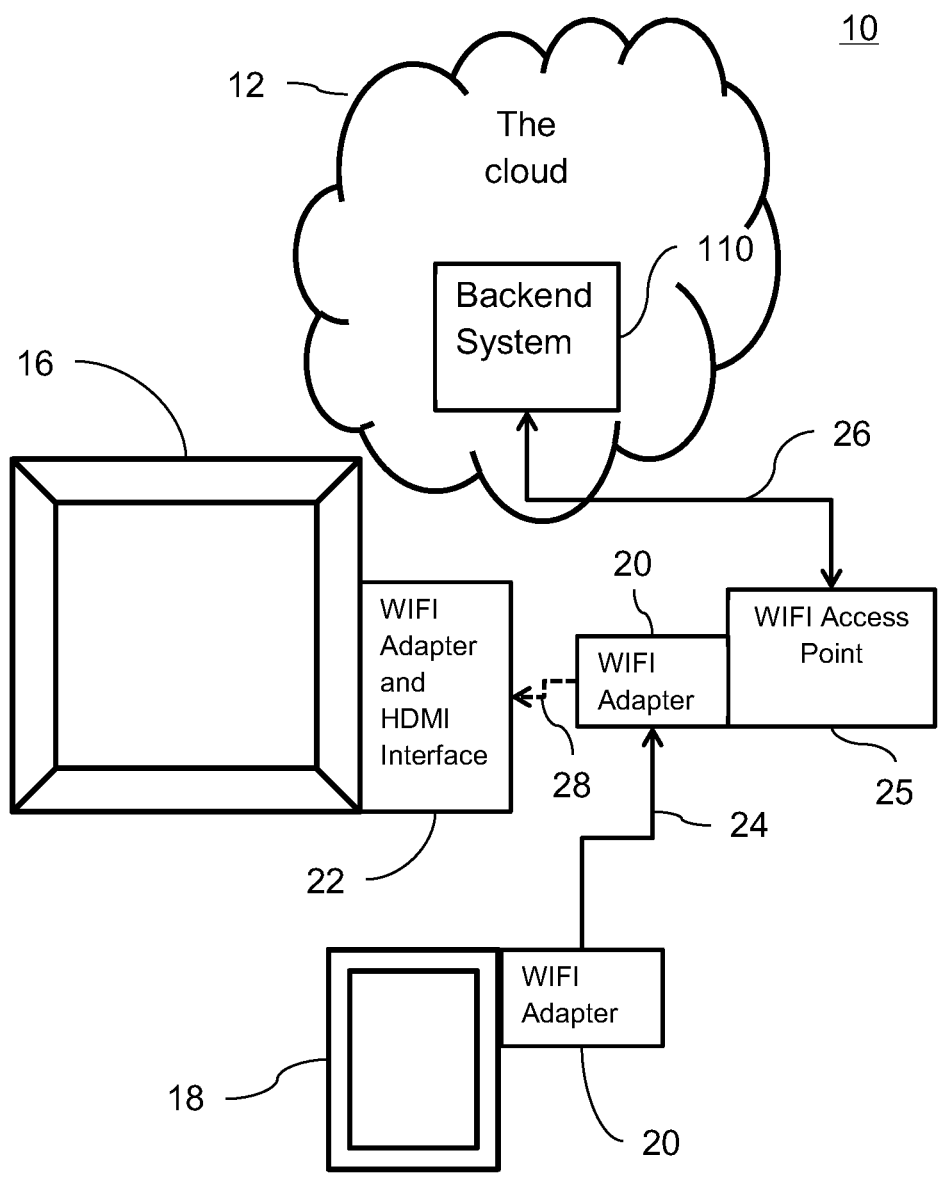

Henceforth, reference is had to the accompanying drawing throughout the present description for a better understanding of the present inventions embodiments, and given examples, wherein:

FIG. 1 schematically illustrates a backend system utilized by the system of the present invention; and FIG. 2 schematically illustrates one embodiment of a system in accordance with the present invention.

DETAILED DESCRIPTION OF PREFERRED EMBODIMENTS

The present invention is at its core a system for distributing live TV content to end consumers. It is in some ways comparable to a traditional pay TV operation, but it differs in some very significant ways. The defining characteristics of the service provided by the invention comprises that it presents content in a modern, easy to access views, such as on-screen EPGs including rich metadata about the content provided, and searches for content. Thus it is enabling to view live TV on a multitude of devices, including smart-phones, pads, computers (through a web browser), and TV sets. The interface to access content is very similar on all devices/apparatuses.

The system and method of the present invention does not tie a subscription to a physical box such as a set top box as it distributes content over the Internet/cloud, admitting anyone with a subscription and a sufficient internet connection access to the service. It operates over 3G/4G networks, as well as fixed internet connections of about 2 Mbit or higher. The content is delivered in a very high quality, even on networks with low bandwidth, the perceived quality will often be significantly better than for traditional TV distribution networks.

Also, the system records/stores all channels, making the content available for a period of time after it has been sent. Even though the focus of the present invention service is on distributing live TV content, the service will also offer different types of on-demand content.

A principle among others that runs all the way through the design of the consumer perspective of the present invention is the end-user simplicity. In this sense it is constructed as simple as possible for an end-user to consume live TV content, helping the consumer finding content that is suitable for any particular moment.

There are two different methods of finding and viewing content through the system of the present invention, either the consumer/end-user both searches and views the content on the same device, or utilizes one device to search and browse for content, and another device as the display for the actual content.

Now with reference to FIG. 2, as an example of the former, it is provided a backend system 110 a consumer/end user 112 using a smart phone for instance an iPhone® or android utilized to browse through an electronic program guide (EPG) through an application program (App) provided by the present invention. By simply clicking a channel symbol in the App, the live content of that channel from a content provider 114 will start playing on the device. By clicking an already aired program, the recorded program will start playing. For a currently airing program, it is also possible to pause and time-shift back in time.

An example of the latter is a consumer 112 utilizing an iPad® to browse for content, and when decided what to view, an option to play the content "in the living room" or similar is selected, enabling the living room TV set to start playing the content. To access these types of use cases, the present invention includes functions for connecting multiple devices to an account, and allowing these devices to talk to and control each other. This is closer described through the text referring to the attached FIG. 2.

An end user 112 can communicate for instance by utilizing Akamai Technologies, Inc., which is an Internet content delivery network, Limelight Networks, which provides simple, dynamic, user interfaces, or Level 3 Communications, which is a multinational telecommunications and Internet service provider company, and other like communication providers 115.

In order to accomplish the latter, the present invention backend system is firstly divided into two main parts, the Business & Administrative System (BAS) 116 and the Media Handling System (MHS). A third main part is the client application program/App that provides consumers access to the present invention services.

As the name implies, BAS 116 handles the business and administrative side of the present invention operation comprising product and service offers to consumers, consumer account information, such as contact information, current and past subscriptions, payment methods, and the like. Furthermore, it provides a customer self-service portal in a server, integration with payment gateways, customer issue tracking, and usage analysis for business development. Hereby, the BAS 116, in one embodiment is built on top of Salesforce®, utilizing the core Salesforce® features for instance customer relation management (CRM), and a 3rd party add-on product O2BCore® from ChikPea® for product and subscription handling.

To build the BAS on top of Salesforce® provides many benefits such as out of the box, Salesforce® already includes a number of useful features, such as CRM, being a cloud-based/Internet solution. Utilizing Salesforce® permits to easily and quickly expand operations to new markets. Salesforce® handles internationalization and localization of content, which is also beneficial for quick expansion into new markets. As such Salesforce® is a very open platform, allowing to extend it if needed, as well as to integrate it through open application programing interfaces (APIs) with e.g. the MHS. The O2BCore® is a native Salesforce® add-on, which means that it is fully built on top of Salesforce®, extending the Salesforce® data model with objects and functions for product and subscription management.

The primary integration between BAS 116 and MHS is through an Access Control Subsystem (ACS) which is part of MHS. The ACS contains information about subscribers and what content they are allowed to access, information which originates in BAS. As soon as subscription information is updated in BAS, it will also be sent to ACS. The main reason for having a copy of this information in MHS is performance, as authorization checks are performed every time a consumer tries to access a content item including both metadata and actual media content.

Another point of integration provided is that the MHS feeds back usage statistics from an Audit Logging Subsystem (ALS) 118 to BAS, so that business development can analyze selected usage data.

The MHS handles the actual media content and metadata 120 about the content. It also handles rating 122, recommendations 124, and interaction with social networks 126 e.g. Facebook 128, Twitter. In order to communicate with social networks 126, an end user 112 has, in one embodiment, access to Janrain Engage 130, which is a turnkey solution that empowers users to register or sign in on your site with an account from one of 25+ social networks and email providers, including Facebook 128, Google, Twitter and Yahoo!. Simplify registration; eliminate the need for users to remember passwords and access rich profile data from a user's 112 social network account with permission.

Moreover, Janrain Engage 130 also lets users 112 share content or activities from your site to their social networks 126, enabling word-of-mouth marketing and driving qualified referral traffic. The Janrain Engage 130 is delivered through a set of customizable JavaScript widgets and robust APIs. And the solution supports cross-channel user 112 acquisition goals with SDKs for mobile sites and applications.

Thus, in one embodiment of the present invention, the MHS consists of the following subsystems; injection 132, transcoding 134, digital rights managing (DRM) 136, storage 138, streaming 140, EPG, media metadata 120, rating 122, recommendation 124, audit logging 118, access control 142, Social 126, real-Time monitoring.

The injection 132 subsystem is responsible for getting content master signals into the present invention system 110. This Injection 132 subsystem is largely agnostic to the contribution signal encoding format, transport layer, and physical delivery media. For example, the encoding formats can be SDI, MPEG-2 4:2:2, MPEG-2 4:2:0, MPEG-4 4:4:4, MPEG-4 4:2:2, MPEG-4 4:2:0, JPEG-2000 or SMPTE VC-1. As the transport layer can be SDI/ASI, IP, DVB-S2, PDH, SDH or NGSDH (DTM).

Physical media can be fiber, coax, TP-cable, xDSL, radio link or DTH. It can also be hybrid solutions such as IP over PDH or Ethernet based FTTB. In one embodiment of the present invention, the preferred contribution method is HD-SDI encoded signals over IP on redundant fiber.

Moreover, the transcoding 134 subsystem is responsible for taking the incoming contribution signal and transcode it into formats suitable for delivery in the present invention services.

The DRM Subsystem is in one embodiment a Widevine® DRM solution. The DRM Subsystem takes the transcoded signal, divides it into small segments for instance around 2 seconds of content per segment, and wraps the segments in a DRM protective cover. Also, the DRM 136 subsystem together with the ACS is responsible for authenticating and authorizing access when a consumer 112 tries to view a particular content item. In one embodiment all transcoded and DRM 136 protected media files are stored on Amazon S3®.

The streaming of content is performed using HTTP Live Streaming (HLS), and is thus essentially just serving files over HTTP. Thus in one embodiment, the streaming 140 subsystem essentially consists of a number of CDN Origin 144 Servers, and the actual CDNs. As for now the present invention utilizes the Amazon content delivery network (CDN) (CloudFront®), but other CDNs will be added.

The EPG 142 subsystem offers a REST API through which consumers can access EPG data using a present invention client application program/App. Both consumers and applications will need to be authenticated and authorized. As such, the EPG 142 subsystem contains information about available channels, the actual EPG data per channel and day, and detailed information about programs. EPG sources 146 are for instance provided by an external provider. For example, EPG data is provided through EPG data in the XML format from one of the EPG source 146 servers with the aid of an HTPP call.

Furthermore, in accordance with the present invention, the media metadata 120 subsystem contains the same basic information as the EPG 142 subsystem. In addition to this, the media metadata 120 subsystem will contain additional metadata about content from other sources. Utilized as a primary interface to the media metadata 120 subsystem is for instance a REST API allowing general searches.

As mentioned in the latter, the system of the present invention records 148 and stores 138 all EPG channels, making the content available for a period of time after it has been sent. The period of time is determined by the provider of the present invention, and may be set on the request of end-users 112.

A rating 122 subsystem of the present invention handles ratings of content items by consumers 112. The rating data may be used for recommendations, as well as being displayed through the social subsystem 126, which is a subject to consumer approval.

Moreover, a recommendation 124 subsystem produces recommendations on what content may be of interest to a particular consumer 112. Recommendations are based on data from several sources, such as the audit logging 118 subsystem, the rating 122 subsystem, and the social 126 subsystem.

Hereby, the audit logging 118 subsystem handles logging of any event in the MHS that may be of interest in an after-the-fact-analysis. This includes both normal events such as a consumer starting to view a particular content item; a new original content item is imported into the MHS, and the like, as well as extraordinary conditions, such as errors of different kinds.

The present invention ALS exposes an asynchronous API that all MHS subsystems can use to post audit log events. The API is built around the concept of topics, where each topic defines a certain class of events. Each topic also defines a set of parameters that must be included in an audit log event for that particular topic. The ALS API rests on top of the Amazon Simple Notification Service, whereby the ALS is an SNS listener which sits on top of Amazon DynamoDB®, storing all the audit log events. This design permits to easily extend the types of events that can be handled by the ALS. It also admits to perform efficient post-processing of the audit logs using Amazon Elastic MapReduce®.

The access control subsystem is essentially a mapping from subscriber IDs to the content items they are allowed to access. The information in ACS is a copy of a subset of the subscriber information available in the BAS. ACS will be utilized to authorize access every time a consumer tries to access a content item.

In accordance with the present invention a social subsystem integrates the MHS with social networks 126 such as Facebook 128, Twitter, and Google+. This may include features such as publishing information about the content a consumer has viewed, ratings, and other information.

Furthermore, a real-time monitoring subsystem monitors and graphs important system parameters, to give a quick view of the system state and health to the operations staff of the present invention.

The present invention system provides native Apps for iPhone®, iPad®, and a number of android devices both phones and pads, but not restricted to those mentioned. A reason for native applications, as opposed to purely web-based applications, is that they are providing a smoother end-user experience, and are able to securely apply the DRM protection.

A web client/application program will be included in the present invention, which for instance allows end-users utilizing a computer to view content using a regular web browser together with a player plug-in which supports the DRM system.

FIG. 2 schematically illustrates one embodiment of a system 10 in accordance with the present invention. Hereby, FIG. 1 depicts the cloud/Internet/iCloud 12, wherein a backend system 14 comprising servers to operate, and to provide the operation of the present invention utilizing the means/apparatuses/devices/software and subsystems mentioned. This embodiment illustrates a TV set/apparatus 16 with HDMI capabilities. It is appreciated that the apparatus 16 could be a computer, Lap-Top, iPad®, Android pad, and like devices having smart device capabilities.

Moreover, a smart-phone/pad 18 such as an iPhone® utilized as a TV remote control through an app stored in the phone 18. With aid of the App an end-user chooses the media content to watch, and for instance clicks on it to view it, and the phones WI-FI adapter/interface 20 connects 24 to a WI-FI access point (AP) 25, through its WI-FI adapter 20, whereby the WI-FI AP 25 connects to the present 26 invention backend system 14 handling the mentioned means which operate the system 10. The backend 14 processes demanded media content to view and re-directs the media content to the WI-FI AP by addressing 28 the WI-FI adapter and HDMI interface/dongle/TV embedded interface 22, and streaming media content to the TV set. Communication signals in the system 10 are wired through the connections 24, 26, 28 wireless and/or by cable, by for instance utilizing the the Internet protocol (IP), which is schematically depicted in FIG. 1.

WI-FI is the name of a wireless networking technology that uses radio waves to provide wireless high-speed Internet and network connections. The Wi-Fi Alliance, the organization that owns the Wi-Fi™ term specifically defines Wi-Fi as any "wireless local area network (WLAN) products that are based on the Institute of Electrical and Electronics Engineers' (IEEE) 802.11 standards."

Alternatively in an embodiment of the present invention, the remote control utilizes a cellular network by radio communication to access the backend system 14, i.e. not a WI-FI adapter, to direct media content to an apparatus 16.

It is appreciated that an alternative to only communicate through WI-FI, would include that the apparatus 16 is wire connected to the internet, but that the remote control still accesses a WI-FI access point to re-direct media content to the apparatus 16. Thus, the media content is transmitted from the Internet to the apparatus through wire/cable.

In accordance with the present invention, as mentioned, a HDMI Dongle 22 a small device with an HDMI interface and a WI-FI interface/adapter is provided. This can be connected to e.g. a TV set lacking smart-TV-set capabilities. Additionally, the dongle can also be equipped with a universal serial bus, USB, interface for power, which contains an application program which allows it to be controlled by other present invention applications, such as the iPhone® application program/App. This permits end-users to view content on any TV set with an HDMI interface, using another device as a remote control.

New modern smart-TV sets and like devices are already provided with an embedded WI-FI adapter, and not utilizing a dongle.

To summarize, servers ones in connection providing media content through an electronic program guide accomplishing this, the invention comprises a backend system 14 and/or comprising (EPG), and an apparatus 16 with a screen having a high-definition multimedia interface (HDMI) capability. Thus comprising an interface 22 interfacing the apparatus 16 screen high-definition multimedia interface, whereby the interface 22 is equipped with a WI-FI adapter.

Moreover the system 10 provides a remote control 18 equipped with, a screen, and at least one of a WI-FI adapter 20, a cellular network radio communication capability, and a web browser, the WI-FI adapter 20 is in connection with a WI-FI access point 25. A software application program adapted to connect 24, 26 to the backend system 14 through, shows electronic program information (EPG) about media content on the remote control 18 screen browsing said electronic program information and selecting a media content to be viewed by an end-user 112 of the remote control 18. In this sense, the remote control 18 could be in contact with any available WI-FI access point 25, i.e. not only an access point situated in the same room as the apparatus 16, but also with access point at any place and country as the remote control not directly controls the apparatus 16, but controls it from the backend system 14. Hence, for instance any suitable TV-set in the world could be initiated by e.g. a barcode function, as is further elaborated below.

In order to clarify, the present invention remote control, it does not directly utilize the apparatus 16 for remote control, but the cloud backend system 14 is remotely controlled to transmit media content/menus to the apparatus 16.

Furthermore, a backend system 14 server software application re-directs the selected streaming media content to the WI-FI access point 25 and addresses the apparatus 16, which is in WI-FI transmitting proximity to the apparatus 16, and receives the streaming selected media content from the backend system 14, and displays the media content on the apparatus screen through the apparatus WI-FI adapter 22. The redirecting of the media content to the apparatus 16 WI-FI adapter is in one embodiment accomplished by utilizing, the apparatus 16 media access control address, MAC address, and it can also be added a unique code. This can either be accomplished through an account in the backend system, held by an end-user listing its devices in the account. Else, as an alternative the remote control 18, when an apparatus 16 is utilized for the first time in accordance with the present invention a barcode is pushed to the TV-set initiated by the remote control 18, and shown on the apparatus 16 screen. Thereafter, the remote control inherent camera/scanner is utilized to photograph/scan the barcode from the screen, whereby the barcode comprises all of the apparatus particulars needed to receive media content from the backend system 14 of the present invention. A barcode to be utilized is a code able to contain enough of characters to hold the apparatus 16 particulars such as a 2D or quick response code and the likes.

The MAC address is a unique identifier assigned to network interfaces for communications on the physical network segment. MAC addresses are used for numerous network technologies and most IEEE 802 network technologies. One embodiment of the present invention comprises that the MAC address and its unique assigned code is utilized to pair the remote control 18 with an apparatus 16.

In one embodiment the EPG menu or other menu presenting media content to can be pushed through the remote control 18 to the apparatus 16. Thus the end user is able to choose media to watch from the apparatus 16 screen, and to select the media to watch by remote control 18. To push data means for instance to allow a device/apparatus to be constantly awake to immediately download new content such as emails, news feeds, menus and the like data as soon as it is available.

The attached set of claims determines other possible embodiments of the present invention to a person skilled in the art of the present technical field.

What is claimed is:

1. A content streaming system, comprising:
a backend system to receive at least one input content stream, process each input content stream, output at least one output content stream via one or more first communication networks, and receive control commands via the one or more first communication networks and react to the control commands received via the one or more first communication networks;
a display apparatus connected to a second communication network to receive the output content stream from the backend system via the one or more first communication networks and reproduce video information in the output content stream; and
a remote control connected to either the second communication network or a third communication network to generate and transmit the control commands to the backend system but to not transmit any commands that control the display apparatus directly to the display apparatus,
wherein,
the backend system comprises an injection section via which each input content stream is received in a first format, a transcoder section that transcodes each input content stream into a respective transcoded content stream in a second format, a digital rights management section that divides each transcoded content stream into respective stream segments and envelopes each stream segment with a digital rights protective cover, a storage section where the stream segments are stored, a streaming section that streams the stream segments to the display apparatus in accordance with the commands transmitted by the remote control, and an electronic program guide generator that generates an electronic program guide (EPG) with information about content that can be streamed to the display apparatus as said streamed segments,
the remote control includes an application for (i) receiving the EPG data from the backend system and (ii) displaying the EPG on the remote control, and enabling a selection, via the EPG on the remote control, of media content to be streamed from the backend system as the at least one output content stream and viewed on the display apparatus,
the remote control comprises logic (i) to read a code displayed on the display apparatus by photographing or scanning the code, the code containing unique identification information that uniquely identifies the display apparatus on the network, and (ii) communicate the code or unique identification information to the backend system,
the backend system pairs the remote control and the display apparatus based on the code or the unique identification information and streams the at least one output content stream to the display, and
the remote control has a display via which the electronic program guide can be displayed.

2. The system of claim 1, wherein the input content stream is a live TV signal.

3. The system of claim 1, wherein:
the electronic programming guide is in an XML format;
the remote control has a web browser capable of viewing data in XML format; and
a user can cause the remote control to transmit commands to the backend system by interacting with the remote control web browser.

4. The system of claim 1, wherein the remote control is a smartphone, tablet or computer.

5. The system of claim 1, wherein the one of the communication networks is the Internet.

6. A backend system with a media handling system to receive at least one input content stream, process each input content stream, output at least one output content stream via one or more first communication networks, and receive control commands via the one or more first communication networks and react to the control commands received via the one or more first communication networks, the media handling system comprising:
an injection section via which each input content stream is received in a first format;
a transcoder section that transcodes each input content stream into a respective transcoded content stream in a second format;
a digital rights management system that divides each transcoded content stream into respective stream segments and envelopes each stream segment with a digital rights protective cover;
a storage section where the stream segments are stored;
a streaming section that streams the stream segments as the at least one output content stream to the one or more first communication networks; and
an electronic program guide generator that generates an electronic program guide with information about content that can be streamed as said streamed segments,
wherein,
the media handling system directs via the one or more first communication networks the at least one output content stream to a display apparatus under the control of commands it receives via a second communication network or a third communication network from a remote control, and the backend system pairs the remote control with the display apparatus on the basis of a code communicated by the remote control to the backend system, the remote control communicating with the backend system via the second or third communication network, the display apparatus communicating with the backend system via the second communication network.

7. The backend system of claim 6, wherein the streaming section includes at least one cloud data network and at least one cloud data origin server and streams the output content streams as files using a hypertext transmission protocol.

8. The backend system of claim 6, wherein the electronic program guide generator includes an application programmer interface via which access is permitted to data of the electronic program guide.

9. The backend system of claim 8, wherein the data of the electronic program guide is in an XML format.

10. The backend system of claim 6, wherein the digital rights management section authenticates and authorizes access to each output content stream.

11. The backend system of claim 6, further comprising a business administrative system via which user accounts can be maintained and user payments processed, the business administrative system interacting with the media handling system via the access control section.

12. The backend system of claim 6, wherein the storage section stores the stream contents for a period of time enabling playback of a selected output content stream commencing with any stored stream segment thereof.

13. The backend system of claim 6, wherein the one of the communication networks is the Internet.

14. A backend system with a media handling system to receive at least one input content stream, process each input content stream, output at least one output content stream via one or more first communication networks, and receive control commands via the one or more first communication networks and react to the control commands received via the one or more first communication networks, the media handling system comprising:
  an injection section via which each input content stream is received in a first format;
  a transcoder section that transcodes each input content stream into a respective transcoded content stream in a second format;
  a digital rights management system that divides each transcoded content stream into respective stream segments and envelopes each stream segment with a digital rights protective cover, the digital rights management system configured to authenticate and authorize access to the output content streams;
  a storage section where the stream segments are stored; and
  a streaming section that streams the stream segments to the one or more first communication networks as the least one output content stream, the streaming section including at least one cloud data network and at least one cloud data origin server and streams the output content streams as files using a hypertext transmission protocol,
wherein,
  the media handling system directs via the one or more first communication networks the at least one output content stream to a display apparatus under the control of commands it receives it receives via a second communication network or a third communication network from a remote control, and
  the backend system pairs the remote control with the display apparatus on the basis of a code communicated by the remote control to the backend system, the remote control communicating with the backend system via the second or third communication network, the display apparatus communicating with the backend system via the second communication network.

15. The backend system of claim 14, further comprising an electronic program guide generator that generates an electronic program guide with information about content that can be streamed as said streamed segments.

16. The backend system of claim 15, wherein the electronic program guide generator includes an application programmer interface via which access is permitted to data of the electronic program guide.

17. The backend system of claim 15, wherein the data of the electronic program guide is in an XML format.

18. The backend system of claim 14, further comprising a business administrative system via which user accounts can be maintained and user payments processed, the business administrative system interacting with the media handling system via the access control section.

19. The backend system of claim 14, wherein the storage section stores the stream contents for a period of time enabling playback of a selected output content stream commencing with any stream segment thereof.

20. The backend system of claim 14, wherein the one of the communication networks is the Internet.

* * * * *